United States Patent
Moriguchi et al.

[11] Patent Number: 6,082,936
[45] Date of Patent: Jul. 4, 2000

[54] COATED HARD METAL TOOL

[75] Inventors: Hideki Moriguchi; Akihiko Ikegaya, both of Hyogo, Japan

[73] Assignee: Sumitomo Electric Industries, Ltd., Osaka, Japan

[21] Appl. No.: 08/871,367

[22] Filed: Jun. 9, 1997

[30] Foreign Application Priority Data

Jun. 12, 1996 [JP] Japan .................................. 8-150774

[51] Int. Cl.$^7$ ...................................................... B23B 27/14
[52] U.S. Cl. ........................... 407/119; 407/118; 407/120
[58] Field of Search .................................... 407/119, 118, 407/115, 116, 117

[56] References Cited

U.S. PATENT DOCUMENTS

| | | | |
|---|---|---|---|
| 3,955,038 | 5/1976 | Lindstrom et al. | 428/457 |
| 4,818,153 | 4/1989 | Strandell et al. | 407/118 |
| 5,074,721 | 12/1991 | Kress et al. | |
| 5,162,147 | 11/1992 | Ruppi | 407/119 |
| 5,325,747 | 7/1994 | Santhanam et al. | 407/119 |
| 5,597,272 | 1/1997 | Moriguchi et al. | 407/119 |
| 5,681,651 | 10/1997 | Yoshimura et al. | 407/119 |
| 5,750,247 | 5/1998 | Bryant et al. | 428/323 |

FOREIGN PATENT DOCUMENTS

| | | |
|---|---|---|
| 0127416 | 12/1984 | European Pat. Off. . |
| 0654317 | 5/1995 | European Pat. Off. . |
| 63-057102 | 3/1988 | Japan . |
| 2-048103 | 2/1990 | Japan . |
| 2-218522 | 8/1990 | Japan . |
| 8-150502 | 6/1996 | Japan . |

*Primary Examiner*—Henry W. H. Tsai
*Attorney, Agent, or Firm*—W. F. Fasse; W. G. Fasse

[57] ABSTRACT

A coated hard metal tool includes a hard metal base material having an edged part on an insert ridge portion defining a connecting portion between a flank and a rake face, and a coating film applied to a surface of the hard metal base material. The coating film has a surface-treated part on the insert ridge portion. The coating film is so formed that $Rc1/(Rs1+d)<1.0$ and $Rc2/(Rs2+d)>1.0$, wherein Rs1 represents the radius of curvature of a convex curved surface formed on the boundary between the flank and the edged part on the surface of the hard metal base material, Rc1 represents the radius of curvature of a convex curved surface formed on the boundary between the flank and the surface-treated part, Rs2 represents the radius of curvature of a convex curved surface formed on the boundary between the rake face and the edged part on the surface of the hard metal base material, Rc2 represents the radius of curvature of a convex curved surface formed on the boundary between the rake face and the surface-treated part, and d represents the average thickness of the coating film in a region other than the edged part. According to this structure, a coated hard metal tool having a long life which is improved in wear resistance with no damage on its breakage resistance can be provided.

17 Claims, 3 Drawing Sheets

COATED HARD METAL TOOL

BACKGROUND OF THE INVENTION

1. Field of the Invention

The present invention relates to a coated hard metal tool, and more particularly, it relates to a technique of improving the wear resistance of a coated hard metal tool without reducing its breakage resistance, by increasing the thickness of a coating film for a hard metal base material and surface-treating an insert ridge portion for specifying its shape after coating.

2. Description of the Background Art

In general, a tool for cutting a metal material is prepared from cemented carbide, i.e., a WC-Co alloy or an alloy prepared by adding a carbo-nitride of Ti, Ta or Nb. In recent years, however, a hard metal tool prepared by coating a surface of a base material consisting of cemented carbide or cermet or that consisting of alumina or silicon nitride ceramics with a coating film of 3 to 15 μm in thickness by CVD (chemical vapor deposition) or PVD (physical vapor deposition) is increasingly used, in order to attain a high cutting speed. The coating film is prepared from a carbide, a nitride, a carbo-nitride, a carbo-oxide, a boronitride or an oxide of a metal belonging to the group IVa, Va or VIa of the periodic table or Al, or a solid solution thereof. A coating film consisting of diamond or diamond-like carbon is also employed.

Such a coated hard metal tool is prepared by rounding an edge of a hard metal base material by honing, chamfering or composite treatment thereof for forming a cutting edge shape and thereby compensating for the breakage resistance of the breakable hard metal, and then coating the base material with a coating film. The coating film is multi-layered by a well-known technique, in order to improve the wear resistance of the tool. However, it is impossible to sufficiently avoid a problem resulting from such conflicting phenomena that the wear resistance is reduced if the amount of edging of the hard metal base material is increased although the breakage resistance is improved, while the breakage resistance is reduced if the amount of edging is reduced although the wear resistance is improved.

Japanese Patent Laying-Open No. 2-48103 (1990) discloses a technique of partially removing a coating film from an insert ridge portion by surface treatment after coating a surface of a hard metal base material with the coating film thereby improving the strength of a cutting edge and attaining improvement of the wear resistance. In the technique described in the aforementioned patent publication, however, improvement of both breakage resistance and wear resistance may not be necessarily attainable, depending on the degree of removal of the coating film.

SUMMARY OF THE INVENTION

An object of the present invention is to provide a coated hard metal tool having a long life, which is improved in wear resistance with no reduction of the breakage resistance by optimizing the shapes of a hard metal base material and a coating layer on its cutting edge.

Another object of the present invention is to provide a coated hard metal tool which is improved in both breakage resistance and wear resistance.

In order to attain the aforementioned objects, a coated hard metal tool according to the present invention comprises a hard metal base material having an edged part on an insert ridge portion defining a connecting portion between a rake face and a flank and a coating film applied to a surface of the hard metal base material, and has a surface-treated part on the insert ridge portion on a surface of the coating film. The feature of this coated hard metal tool resides in that the coating film is so formed that $Rc1/(Rs1+d)<1.0$, assuming that $Rs1$ represents the radius of curvature of a convex curved surface formed on the boundary between a flank and the edged part, $Rc1$ represents the radius of curvature of a convex curved surface formed on the boundary between the flank and the surface-treated part on the surface of the coating film, and $d$ represents the average thickness of the coating film in a region other than the surface-treated part.

According to this structure, the coating film is so formed that $Rc1/(Rs1+d)<1.0$, whereby the wear resistance can be improved without reducing the breakage resistance.

The inventors have noted the relation between the radii of curvature of the cutting edge on the hard metal base material and the coating layer and discovered the aforementioned structure according to the present invention, in the following particulars:

It is already known that the breakage resistance of a coated hard metal tool is controlled by toughness which is decided by the material of the hard metal base material serving as a matrix to be coated, and by an edged shape of the uncoated hard metal base material. When the hard metal base material is coated with an oxide such as alumina or $ZrO_2$, the thickness of the coating film generally tends to be maximized on a corner portion of the cutting edge forming an insert ridge. Assuming that $Rc1$ represents the radius of curvature of the coating film surface on the boundary between the flank and the surface-treated insert portion, $Rs1$ represents the radius of curvature of the hard metal base material surface corresponding thereto and $d$ represents the average thickness of the coating film in a region other than the surface-treated part, therefore, these values are generally in a relation satisfying $Rc1>Rs1+d$. When a technique of suppressing maximization of the film thickness on the corner portion by employing $H_2S$ as raw material gas for coating the base material with an alumina film is employed, however, it is possible to form a coating film having a substantially uniform thickness satisfying a relation $Rc1=Rs1+d$ on the cutting edge of the hard metal base material.

The sharpness of the coated tool, which is decided by the magnitude of the radius $Rc1$ of curvature, is slightly reduced as compared with that in an uncoated state, while the wear resistance is also deteriorated. It has been proved that this tendency is increased as the thickness of the coating film is increased, and particularly remarkable when the thickness exceeds 15 μm.

To this end, the inventors have made an attempt to increase the radius $Rs1$ of curvature on the boundary between the flank and the edged insert portion of the hard metal base material as compared with that of a conventional tool, coat the base material with a film having a larger thickness than the conventional one, and thereafter surface-treat the coating film.

At this time, the inventors have discovered that the wear resistance of the coated hard metal tool can be improved with no damage on the breakage resistance by reducing the radius $Rc1$ of curvature and edging the insert portion to attain a cutting edge shape satisfying the relation $Rc1<Rs1+d$.

In the coated hard metal tool according to the present invention, the coating film is preferably so formed that $Rc2/(Rs2+d)>1.0$, assuming that $Rs2$ represents the radius of curvature of a convex curved surface formed on the boundary between the rake face and the edged part on the surface of the hard metal base material and Rc2 represents the radius of curvature of a convex curved surface formed on the boundary between the rake face and the surface-treated part on the surface of the coating film in the aforementioned structure. Both the breakage resistance and the wear resistance can be improved by satisfying both relations Rc1/(Rs1+d)<1.0 and Rc2/(Rs2+d)>1.0.

In order to further attain the effect of improving the breakage resistance and the wear resistance, the tool is preferably so formed that the ratio Rc1/(Rs1+d) is at least 0.2 and not more than 0.8 and/or the ratio Rc2/(Rs2+d) is at least 2.0 and not more than 5.0.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment of the present invention is now described with reference to the drawings.

Figure 1:
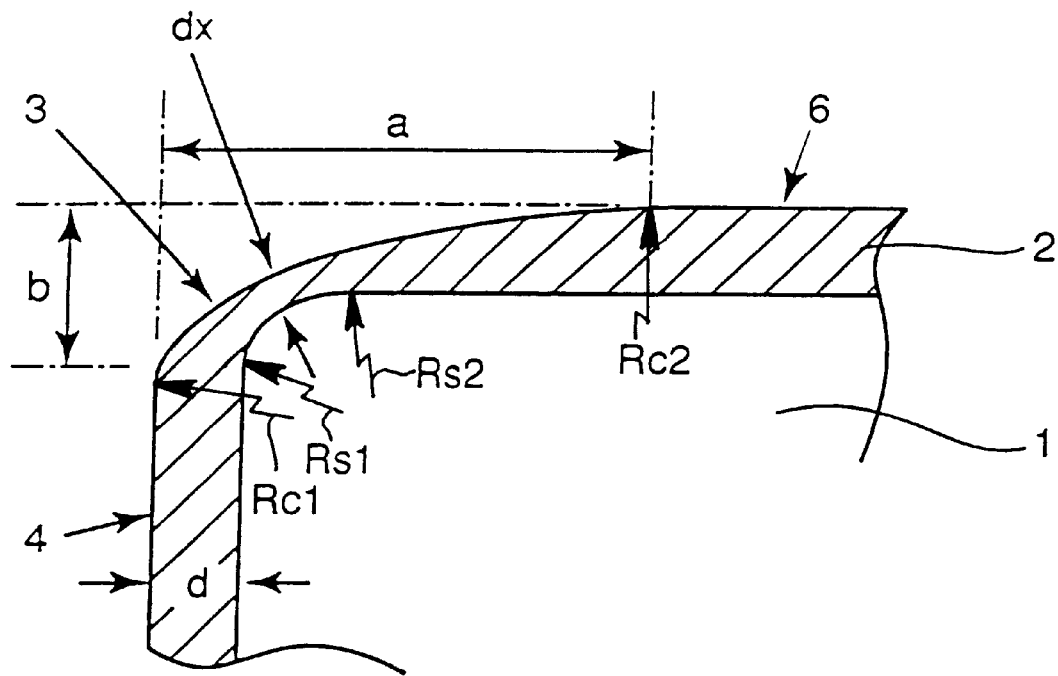
FIG. 1 is a sectional view showing shapes of an edged part of a hard metal base material and a surface-treated part of a coating film on an insert ridge portion of a coated hard metal tool according to the present invention.

Referring to FIG. 1, a surface of a hard metal base material 1 having an edged insert ridge portion or cutting edge portion 3 defining a connecting portion between a flank 4 and a rake face 6 is coated with a coating film 2, which in turn is surface-treated for forming a surface-treated part on the insert ridge portion 3 provided on the surface of the coating film 2, thereby forming a hard metal tool having the sectional shape shown in FIG. 1.

In the coated hard metal tool shown in FIG. 1 formed in the aforementioned manner, the edged part of the hard metal base material 1 and the surface-treated part of the coating film 2 are so formed as to satisfy relations Rc1/(Rs1+d)<1.0 and Rc2/(Rs2+d)>1.0, assuming that Rs1 represents the radius of curvature of a convex curved surface formed on the boundary between the flank 4 and the edged part 3 on the surface of the hard metal base material 1, Rc1 represents the radius of curvature of a convex curved surface formed on the boundary between the flank 4 and the surface-treated part over the edged part 3 on the surface of the coating film 2, d represents the average thickness of the coating film 2 in a region other than the surface-treated part, Rs2 represents the radius of curvature of a convex curved surface formed on the boundary between the rake face 6 and the edged part 3 on the surface of the hard metal base material 1, and Rc2 represents the radius of curvature of a convex curved surface formed on the boundary between the rake face 6 and the surface-treated part over the edged part 3 on the surface of the coating film 2 in the aforementioned structure.

Thus, both breakage resistance and wear resistance can be improved by satisfying both relations Rc1/(Rs1+d)<1.0 and Rc2/(Rs2+d)>1.0. The wear resistance can be improved without reducing the breakage resistance by satisfying at least only the relation Rc1/(Rs1+d)<1.0.

Figure 2:
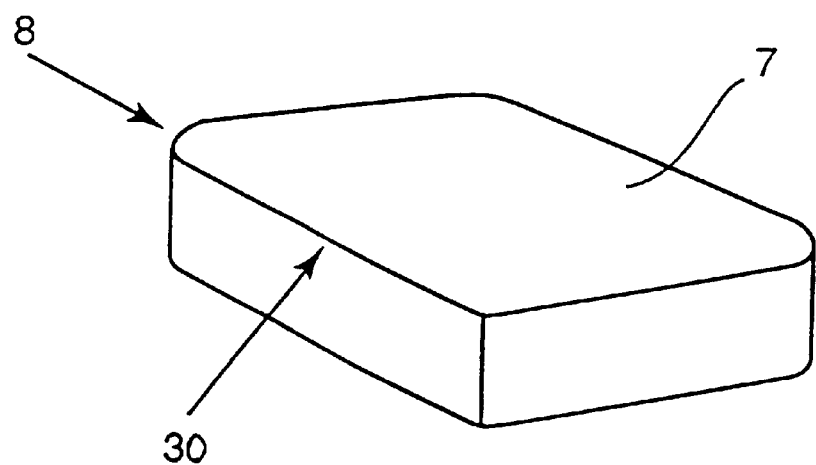
FIG. 2 is a perspective view showing the shape of an indexable insert employed for verifying the effect of the present invention.

While the relations expressed in these inequalities preferably hold for all rounded nose portions 8 of an insert 30 of an indexable insert 7 shown in FIG. 2, the aforementioned effect is attained to some extent when these relations hold for parts thereof.

The value of the radius Rc1 of curvature is measured as follows: First, the coated hard metal tool having the surface-treated coating film 2 is cut along a section perpendicular to its insert, and thereafter the cut surface is embedded in a resin member. This cut surface is surface-ground and mirror-polished, thereafter etched, and thereafter gold is deposited thereon as needed. A photograph of a part around the insert ridge portion of the sample formed in the aforementioned manner is taken with an optical microscope in a magnification of 1500. This photograph is analyzed in an image processor, for determining points A and B separated from a starting point O on the boundary between an untreated part and the surface-treated part of the coating film on the flank side, whereby point A is separated from O by 5 μm toward the rake face, and point B is separated from O by 5 μm toward the flank, respectively, on the surface of the coating film on this image. The radius of a circle passing through the points O, A and B determined in the aforementioned manner is calculated on the basis of the (x, y) coordinates thereof, thereby obtaining the radius Rc1 of curvature. The radii Rc2, Rs1 and Rs2 of curvature are obtained in a similar manner to the above.

The surface of the coating film 2 is suitably treated with a brush containing a hard substance such as diamond or SiC, or with an elastic grindstone, while the present invention is not restricted to this form of surface treatment. The cutting edge shape after the surface treatment is influenced by the speed of rotation of the brush or the grindstone, the hardness thereof, the angle of treatment with respect to the rake face of the tool, the pressing force of the grindstone, the presence or absence of cutting oil, and the like. In order to obtain a desired cutting edge shape, therefore, it is necessary to properly define these conditions.

The hard metal base material 1 can be prepared from cemented carbide, cermet or ceramic such as silicon nitride or fiber-reinforced ceramic (FRC), for example, and the employed material may have a gradient composition. The material having a gradient composition can be provided with a tough layer or a ceramic layer on its surface. The material for the coating layer 2 can be prepared from a carbide, a nitride, a carbo-nitride, a carbo-oxide, a boronitride or an oxide of an element belonging to the group IVa, Va or VIa of the periodic table, i.e., Ti, Zr or Hf; V, Nb or Ta; or Cr, Mo or W, or Al, or a solid solution thereof. The minimum coating layer 2 may alternatively be prepared from diamond or diamond-like carbon. This coating layer 2 is formed by CVD or PVD.

The coated hard metal tool according to this embodiment is so formed that the ratio dx/d is at least 0.2 and not more than 0.8, assuming that the average thickness of the coating film for the hard metal base material is at least 15 μm and dx represents the minimum thickness of the coating film 2 on the insert ridge portion which is reduced to the minimum thickness by the surface treatment.

If a constant thickness of a coating film exceeds 15 μm in a conventional hard metal tool, the radius Rc1 of curvature on the surface of this coating film is increased, which in turn reduces the sharpness of the hard metal tool. When the coated hard metal tool is so formed that the ratio dx/d is within the range of 0.2 to 0.8 assuming that d represents the average thickness of the coating film 2 on the flank 4 which is an unedged region, and dx represents the minimum thickness of the smallest part of the insert ridge portion 3 which is reduced in thickness by the surface treatment, on the other hand, the sharpness of the tool can be improved when the coating film 2 has an unthinned part with a thickness of at least 15 μm, which has not been put into practice in general, and the wear resistance is improved. Consequently, a coated hard metal tool provided with the coating film 2 having a thickness of 20 to 50 μm can be put into practice.

The ratio dx/d is set to be at least 0.2, since the wear time up to exposure of the hard metal base material 1 resulting from wear of the coating film 2 is extremely shortened to reduce the wear resistance if the value is less than 0.2, while no remarkable further improvement of the breakage resistance is recognized even if the value is set to exceed 0.8.

The coated hard metal tool is preferably so formed that the ratio Rs2/Rs1 of the two radii of curvature of the hard metal base material 1 is at least 0.7 and not more than 1.3. When the ratio Rs2/Rs1 is set in the range of 0.7 to 1.3, stress concentration of cutting resistance acting on the insert ridge portion 3 of the hard metal base material 1 is relaxed. The tool is preferably edged by grinding with a centrifugal or vibrating barrel. This edging method is effective as an industrial means of smoothing the surface of the hard metal base material 1 to not more than 0.3 μm in Rmax. The wear resistance is reduced if the ratio Rs2/Rs1 is less than 0.7, while the breakage resistance is reduced if this ratio exceeds 1.3.

The coated hard metal tool is preferably so formed that the ratio Rc2/Rc1 of the two radii of curvature on the surface of the coating film 2 is at least 2.0 and not more than 50. When the coated hard metal tool is so formed that the ratio Rc2/Rc1 is in the range of 2.0 to 50, the wear resistance and the breakage resistance are extremely well-balanced with each other. The wear resistance is deteriorated if the ratio Rc2/Rc1 is less than 2.0, while the breakage resistance is reduced if this ratio exceeds 50.

The edged part on the surface of the coating film 2 is preferably so formed that the ratio a/b is at least 1.5 and not more than 4.0 assuming that "a" and "b" represent its widths on the rake face side and the flank side respectively, as shown in FIG. 1. The effect of improving the wear resistance is reduced if the ratio a/b is less than 1.5, while the breakage resistance is reduced if this ratio exceeds 4.0.

Figure 6A:
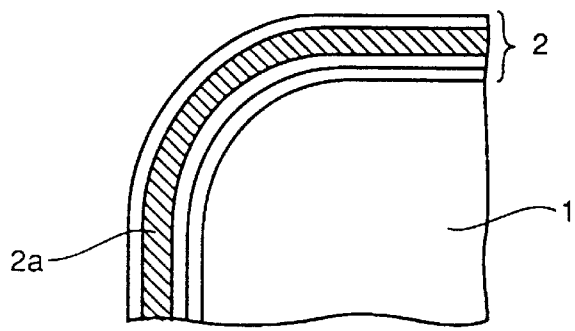
FIG. 6A is a sectional view showing a coated hard metal tool coated with a four-layer coating film not yet surface-treated.
Figure 6B:
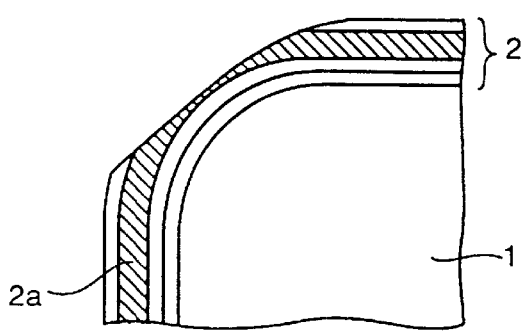
FIG. 6B is a sectional view showing the coated hard metal tool having an oxide ceramic layer remaining on the overall insert ridge portion after surface treatment of the coating film.
Figure 6C:
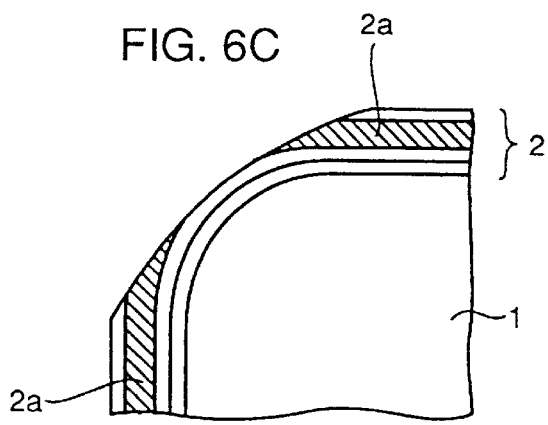
FIG. 6C is a sectional view showing the coated hard metal tool in a state after removal of the oxide ceramic layer from a part of the insert ridge portion.

Preferably, the coating film 2 has a multilayer structure including at least one oxide ceramic layer, and is so surface-treated that a part of the thickness of at least one of the oxide ceramic layer or layers remains along the overall region of the insert ridge portion. For example, a coated hard metal tool having a coating layer 2 consisting of four layers with only one layer consisting of an oxide ceramic layer 2a as shown in FIG. 6A exhibits excellent wear resistance if a part of the thickness of the oxide ceramic layer 2a remains along the overall region of an edged part as shown in FIG. 6B, while the wear resistance may be deteriorated if the entire thickness of the oxide ceramic layer 2a is removed from a portion of the edged part as shown in FIG. 6C.

Figure 3:
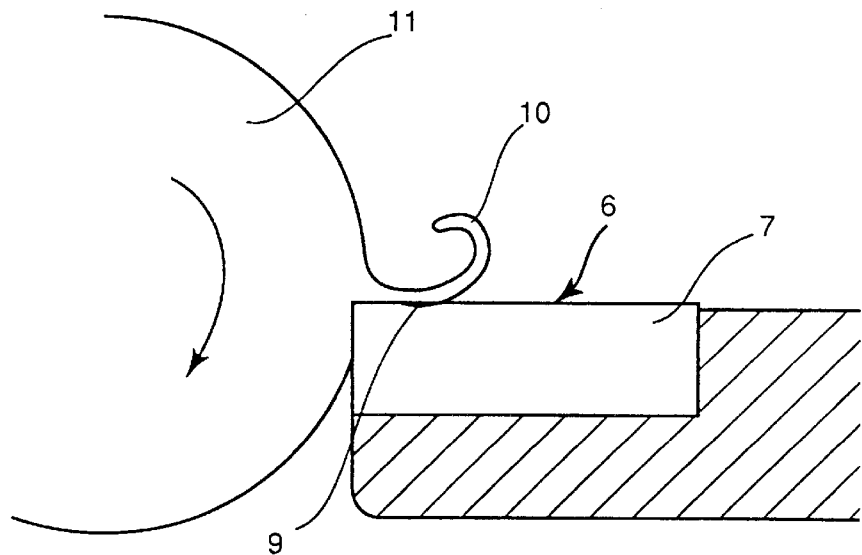
FIG. 3 is adapted to illustrate crater wear caused on a contact surface between a chip and a rake face of an indexable insert in a cutting test.

In more concrete terms, the occurrence of crater wear 9 at a location shown in FIG. 3 resulting from increase of a cutting temperature in high-efficiency cutting is remarkably suppressed due to the presence of the oxide ceramic layer 2a on the insert ridge portion 3. Particularly when the aforementioned ratio a/b is in the range of 1.5 to 4, the coating film is removed to a large extent on the side of the rake face 6 by the surface treatment, and a region in which crater wear 9 is easily caused overlaps with a contact surface of a swarf 10. Thus, it is extremely effective to reduce the crater wear 9 by leaving the oxide ceramic layer 2a.

In the coated hard metal tool according to this embodiment, an increasing surface area rate on at least a portion of the surface-treated part of the coating film 2 is set to be at least 0.1% and not more than 1.3%. The increasing surface area rate on the insert ridge portion 3 after the surface treatment is set in the range of 0.1 to 1.3%, whereby peeling resistance of the coating film 2 can be improved in addition to the improvement of the breakage resistance and the wear resistance. While the peeling resistance of the coating film 2 is improved as the finished surface formed after the surface treatment approaches a mirror face, it is industrially difficult to treat the surface so that the increasing surface area rate is less than 0.1%, while the peeling resistance cannot be highly improved if the increasing surface area rate exceeds 1.3%. The degree of exposure of the hard metal base material surface on the edged part during cutting is suppressed due to improvement of the peeling resistance of the coating film 2, whereby a workpiece is inhibited from adhesion welding to the edged part, and the breakage resistance of the tool can be further improved as a result.

Figure 4A:
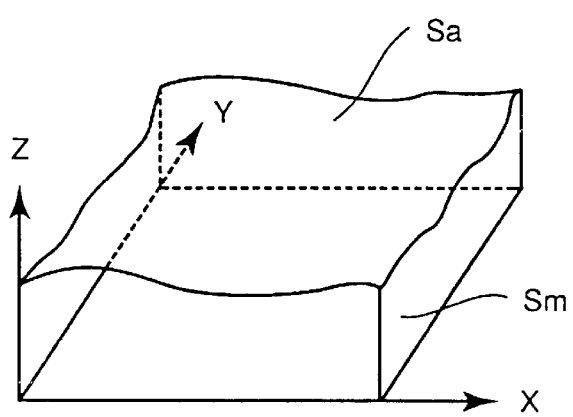
FIG. 4A is a typical perspective view for illustrating the definition of an increasing surface area rate.

The increasing surface area rate is a numerical value quantified by a mathematical expression (Sa/Sm−1)×100%, assuming that Sm represents a measuring field area and Sa represents the surface area of the measured part, as shown in FIG. 4A. Namely, this value expresses the increasing rate of a surface irregularity area of the measuring field area region with respect to the surface area on the assumption that the measuring field area region is a perfect mirror face. The surface area is quantified by this numerical value since information related to three-dimensional surface roughness including horizontal surface roughness can be quantified with this numerical value, while the conventional roughness index such as Rmax or Ra can express only surface roughness in the vertical direction.

Figure 4B:
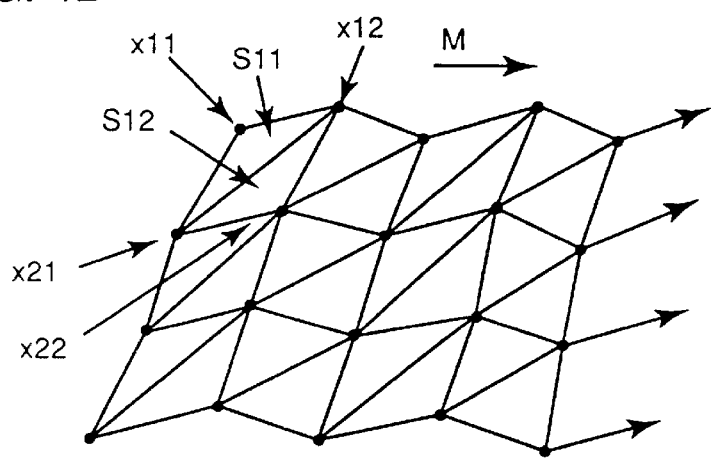
FIG. 4B is adapted to illustrate a method of obtaining the surface area of a measured part by sampling.

The surface area Sa of the measured part is obtained by sampling and obtaining the coordinates of locations or nodes shown by black points in FIG. 4B along arrow M and calculating the sum of areas s11, s12, . . . of triangles having apices formed by the sampling points x11, x12, x21, . . . on the surface of the measured part.

Examples verifying the effect of the present invention are now described.

EXAMPLE 1

A class ISO-P20 indexable insert of shape No. SNMG120408 was so edged that the widths Rs1 and Rs2 on its insert ridge portion were 60 μm and 90 μm respectively, and coated with a ceramic coating film, having the width d of 10 μm, consisting of four layers including a lowermost TiN layer of 0.5 μm, an intermediate TiCN layer of 7 μm, an intermediate $Al_2O_3$ layer of 2 μm and an uppermost TiN layer of 0.5 μm by CVD at a temperature of about 1000° C. $H_2S$ gas was employed as raw material for forming the alumina layer and preventing the same from thickness maximization on an edge portion. Thus, it was possible to obtain a coating film having substantially no difference in thickness between flat and edge portions.

Samples of this coated indexable insert were prepared at various rake angles which were formed by a nylon brush with #400 diamond abrasive grains, to have different values of Rc2 as shown in Table 1 and Rc1 that can be calculated from Table 1. Each sample was employed for interrupted cutting of a workpiece 11 consisting of a hard carbon steel material (SCM435) provided with four grooves 12 on its outer periphery as shown in cross-section in FIG. 5 under the following conditions for evaluation of the breakage resistance, while the wear resistance of each sample was evaluated by cutting a workpiece of a round bar consisting of a low carbon steel material (SCM415) under the following conditions shown further below.

Breakage Resistance Test 1

Cutting Speed: 100 m/min.

Feed Rate: 0.2 to 0.4 mm/rev.

Depth of Cut: 2 mm

Cutting Oil: No

Employed Holder: PSUNR2525-43

The time between the start of cutting and occurrence of breakage was regarded as the lifetime of each individual test, and the average of the lifetimes at four corners of each sample was regarded as the lifetime of this sample.

Wear Resistance Test 1

Cutting Speed: 300 m/min.

Feed Rate: 0.3 mm/rev.

Depth of Cut: 1.5 mm

Cutting Time: 30 min.

Cutting Oil: Yes

Table 1 shows the results.

TABLE 1

| Sample No. | Surface Treatment | d (μm) | Rc2 (μm) | R2 Ratio | R1 Ratio | Tav (sec.) | W (mm) |
|---|---|---|---|---|---|---|---|
| Comparative Sample 1-1 | no | 10 | 100 | 1.00 | 1.00 | 26 | 0.25 |
| Comparative Sample 1-2 | yes | 10 | 80 | 0.80 | 1.14 | 26 | 0.28 |
| Inventive Sample 1-1 | Yes | 10 | 90 | 0.90 | 0.93 | 27 | 0.22 |
| Inventive Sample 1-2 | yes | 10 | 85 | 0.85 | 0.86 | 29 | 0.20 |
| Inventive Sample 1-3 | yes | 10 | 90 | 0.90 | 0.79 | 31 | 0.17 |
| Inventive Sample 1-4 | yes | 10 | 90 | 0.90 | 0.57 | 28 | 0.16 |
| Inventive Sample 1-5 | yes | 10 | 90 | 0.90 | 0.21 | 25 | 0.15 |
| Inventive Sample 1-6 | yes | 10 | 95 | 0.95 | 0.14 | 19 | 0.15 |

Notes:
1. d: average thickness of coating film on untreated surface part
2. R2 ratio: Rc2/(Rs2 + d) R1 ratio: Rc1/(Rs1 + d)
3. Tav: average lifetime in breakage resistance test 1
4. W: abrasion loss in wear resistance test 1

It is understood from the results in Table 1 that the inventive samples 1-1 to 1-6 having the values of Rc1 smaller than the value Rs1+d were improved in wear resistance with no negative influence on the breakage resistance, as compared with the comparative sample 1-1 that was not subjected to surface treatment and the comparative sample 1-2 that was subjected to surface treatment but out of the inventive range. In particular, the inventive samples 1-3 to 1-5 having the ratios Rc1/(Rs+d) within the range of 0.2 to 0.8 exhibited particularly excellent wear resistance.

EXAMPLE 2

Surfaces of base materials formed by class ISO-P20 cermet indexable inserts were coated with coating films having thicknesses d of 10 to 22 μm, for preparing a comparative sample 2-1 and inventive samples 2-1 to 2-7 having different values of Rc2, Rs2, Rc1 and Rs1 with the same diamond brush as that employed in Example 1. Table 2 shows test results of these samples.

TABLE 2

| Sample No. | Surface Treatment | Rc2 (μm) | Rs2 (μm) | d (μm) | R2 Ratio | R1 Ratio | Tav (sec.) | W (mm) |
|---|---|---|---|---|---|---|---|---|
| Comparative Sample 2-1 | yes | 80 | 60 | 10 | 1.14 | 1.20 | 5 | 0.28 |
| Inventive Sample 2-1 | yes | 60 | 60 | 10 | 0.86 | 0.82 | 12 | 0.22 |
| Inventive Sample 2-2 | yes | 80 | 60 | 10 | 1.14 | 0.82 | 16 | 0.22 |
| Inventive Sample 2-3 | yes | 120 | 60 | 10 | 1.71 | 0.78 | 19 | 0.17 |
| Inventive Sample 2-4 | yes | 200 | 70 | 22 | 2.17 | 0.84 | 31 | 0.18 |
| Inventive Sample 2-5 | yes | 250 | 50 | 16 | 3.79 | 0.65 | 25 | 0.15 |
| Inventive Sample 2-6 | yes | 350 | 60 | 13 | 4.79 | 0.75 | 27 | 0.16 |
| Inventive Sample 2-7 | yes | 400 | 60 | 10 | 5.71 | 0.70 | 19 | 0.23 |

Notes:
1. R2 ratio: Rc2/(Rs2 + d), R1 ratio: Rc1/(Rs1 + d)
2. Tav: average lifetime in breakage resistance test 1
3. W: abrasion loss in wear resistance test 1
4. d: average thickness of coating film on untreated surface part As understood from the results shown in Table 2, the inventive samples 2-1 to 2-7 exhibited excellent breakage resistance and wear resistance as compared with the comparative sample 2-1 which was out of the inventive range. The inventive samples 2-2 to 2-7 having the ratios Rc2/(Rs2+d) larger than 1.0 exhibited particularly excellent cutting characteristics, and the inventive samples 2-4 to 2-6 having the ratios Rc2/(Rs2+d) within the range of 2.0 to 5.0 exhibited superior cutting performance in particular.

EXAMPLE 3

A wear resistance test similar to that in Example 1 was carried out on inventive samples 3-1 to 3-4 which were prepared from hard metal base materials having the same values of Rs1 (60 μm) and Rs2 (90 μm) as the comparative sample 1-1 prepared in Example 1, with coating films identical to those in Example 1 except thicknesses of intermediate TiCN layers shown in Table 3, and have been surface-treated with a diamond brush similarly to Example 1 so that the values of Rc1 and Rc2 were 40 μm and 90 μm respectively identically to the inventive sample 1-4. Table 4 shows the test results.

TABLE 3

| Sample No. | Structure of Coating Film | d (μm) |
|---|---|---|
| Inventive Sample 1-4 | base material/ 0.5 μm TiN/7 μm TiCN/2 μm Al$_2$O$_3$/0.5 μm TiN | 10 |
| Inventive Sample 3-1 | base material/ 0.5 μm TiN/10 μm TiCN/2 μm Al$_2$O$_3$/0.5 μm TiN | 13 |
| Inventive Sample 3-2 | base material/ 0.5 μm TiN/13 μm TiCN/2 μm Al$_2$O$_3$/0.5 μm TiN | 16 |
| Inventive Sample 3-3 | base material/ 0.5 μm TiN/19 μm TiCN/2 μm Al$_2$O$_3$/0.5 μm TiN | 12 |
| Inventive Sample 3-4 | base material/ 0.5 μm TiN/37 μm TiCN/2 μm Al$_2$O$_3$/0.5 μm TiN | 40 |

TABLE 4

| Sample No. | R2 Ratio | R1 Ratio | V1 (mm) | V0 (mm) | Improvement Ratio (%) | d (μm) |
|---|---|---|---|---|---|---|
| Inventive Sample 1-4 | 0.90 | 0.57 | 0.16 | 0.25 | 36.0 | 10 |
| Inventive Sample 3-1 | 0.87 | 0.54 | 0.15 | 0.25 | 40.0 | 13 |
| Inventive Sample 3-2 | 0.85 | 0.53 | 0.13 | 0.28 | 53.6 | 16 |
| Inventive Sample 3-3 | 0.80 | 0.49 | 0.12 | 0.31 | 61.3 | 22 |
| Inventive Sample 3-4 | 0.69 | 0.40 | 0.12 | 0.34 | 64.7 | 40 |

Notes:
1. R2 ratio: Rc2/(Rs2 + d), R1 ratio: Rc1/(Rs1 + d)
2. V1: abrasion loss of surface-treated sample in wear resistance test 1
3. V0: abrasion loss of sample with no surface treatment in wear resistance test 1
4. improvement ratio: (V0 − V1)/V0 × 100
5. d: average thickness of coating film on untreated surface part It is understood from the results shown in Table 4 that the inventive samples 3-2 to 3-4 provided with the coating films having the thicknesses d larger than 15 μm were improved in cutting performance in particularly high degrees.

Then, inventive samples 4-1 to 4-6 having different thicknesses on insert ridge portions were prepared from the inventive sample 3-3 (Rs1=60 μm, Rs2=90 μm and d=22 μm) by setting a rake angle of the brush with respect to the indexable inserts at −10° and changing surface treatment times. A comparative sample 4-2 was prepared with absolutely no surface treatment. Further, a comparative sample 4-1 out of the inventive range was prepared by setting the rake angle of the brush with respect to the indexable insert at 30° and performing surface treatment. The values of Rc1 of the inventive samples 4-1 to 4-6 prepared in the aforementioned manner were 40 μm, 42 μm, 45 μm, 47 μm, 48 μm and 50 μm respectively, i.e., within the range of 40 to 50 μm, while that of the comparative sample 4-1 was 100 μm. Further, the values of Rc2 of the inventive samples 4-1 to 4-6 were 70 μm, 75 μm, 80 μm, 83 μm, 86 μm and 90 μm respectively, i.e., within the range of 70 to 90 μm, while that of the comparative sample 4-1 was 90 μm.

Table 5 shows the results of a cutting test on the inventive and comparative samples.

TABLE 5

| Sample No. | Surface Treatment | R2 Ratio | R1 Ratio | dx (μm) | dx/d | Tav (sec.) | W (mm) |
|---|---|---|---|---|---|---|---|
| Comparative Sample 4-1 | yes | 0.80 | 1.22 | 20 | 0.77 | 32 | 0.30 |
| Comparative Sample 4-2 | no | 1.00 | 1.00 | 22 | 1.00 | broke at first stage | 0.31 |
| Inventive Sample 4-1 | yes | 0.63 | 0.49 | 20 | 0.91 | 9 | 0.14 |
| Inventive Sample 4-2 | yes | 0.67 | 0.51 | 17 | 0.77 | 27 | 0.14 |
| Inventive Sample 4-3 | yes | 0.71 | 0.55 | 13 | 0.59 | 46 | 0.13 |
| Inventive Sample 4-4 | yes | 0.74 | 0.57 | 8 | 0.36 | 49 | 0.13 |
| Inventive Sample 4-5 | yes | 0.77 | 0.59 | 5 | 0.23 | 52 | 0.13 |

TABLE 5-continued

| Sample No. | Surface Treatment | R2 Ratio | R1 Ratio | dx (μm) | dx/d | Tav (sec.) | W (mm) |
|---|---|---|---|---|---|---|---|
| Inventive Sample 4-6 | yes | 0.80 | 0.61 | 3 | 0.14 | 33 | sparked in 25 min. test interrupted |

Notes:
1. R2 ratio: Rc2/(Rs2 + d), R1 ratio: Rc1/(Rs1 + d)
2. Tav: average lifetime in breakage resistance test 1
3. W: abrasion loss in wear resistance test 1
4. dx: minimum thickness of smallest portion of coating film,
5. d: average thickness of coating film on untreated surface part As understood from the test results shown in Table 5, the life time of the inventive samples 4-1 to 4-6 remarkably extended while the comparative sample 4-2 that was not subjected to a surface treatment was initially chipped in the breakage resistance test. From the results of the wear resistance test, it is understood that the inventive samples were improved in wear resistance, except the sample 4-6. In total consideration of these results, it is understood that the inventive samples 4-2 to 4-5 having the ratios dx/d within the range of 0.2 to 0.8 were particularly excellent in cutting performance. In particular, the inventive samples 4-3 to 4-5 having the ratios dx/d within the range of 0.2 to 0.6 exhibited particularly superior breakage resistance.

EXAMPLE 4

Comparative samples 5-1 and 5-2 and inventive samples 5-1 to 5-5 having different values of Rc1 and Rc2 were prepared by coating indexable inserts so that the values of Rs1 and Rs2 were 30 μm on insert ridge portions of class ISO-K10 base materials of shape No. SNMG120408 with ceramic films having average thicknesses d of 10 μm similarly to Example 1 and thereafter surface-treating the same. These indexable insert samples were employed for cutting workpieces of FCD450 and FCD700 for evaluation of breakage resistance and wear resistance under the following conditions respectively. In these tests, ductile iron was used due to employment of the class K10 base materials.

Breakage Resistance Test 2

Cutting Speed: 150 m/min.

Feed Rate: 0.2 to 0.4 mm/rev.

Depth of Cut: 2 mm

Cutting Oil: Yes

The time between the start of cutting and occurrence of breakage was regarded as the lifetime of each particular cutting test, and the average of the lifetimes at four corners of each sample was regarded as the lifetime of this sample.

Wear Resistance Test 2

Cutting Speed: 200 m/min.

Feed Rate: 0.3 mm/rev.

Depth of Cut: 1.5 mm

Cutting Time: 10 min.

Cutting Oil: Yes

Table 6 shows the results of these cutting tests.

TABLE 6

| Sample No. | Surface Treatment | Rs1 (μm) | Rc1 (μm) | Rc2 (μm) | R2 Ratio | R1 Ratio | Rc Ratio | Tav (sec.) | W (mm) |
|---|---|---|---|---|---|---|---|---|---|
| Comparative Sample 5-1 | no | 30 | 40 | 40 | 1.00 | 1.00 | 1.3 | 75 | 0.25 |
| Comparative Sample 5-2 | yes | 30 | 50 | 150 | 3.75 | 1.25 | 3.0 | 90 | 0.29 |
| Inventive Sample 5-1 | yes | 30 | 25 | 18 | 0.45 | 0.63 | 0.7 | 144 | 0.22 |
| Inventive Sample 5-2 | yes | 30 | 20 | 42 | 1.05 | 0.50 | 2.1 | 161 | 0.15 |
| Inventive Sample 5-3 | yes | 30 | 15 | 200 | 5.00 | 0.38 | 13.3 | 178 | 0.14 |
| Inventive Sample 5-4 | yes | 30 | 11 | 500 | 12.5 | 0.28 | 45.5 | 153 | 0.12 |
| Inventive Sample 5-5 | yes | 30 | 10 | 600 | 15.0 | 0.25 | 60.0 | 107 | 0.11 |

Notes:
1. R2 ratio: Rc2/(Rs2 + d), R1 ratio: Rc1/(Rs1 + d), Rc ratio: Rc2/Rc1
2. Tav: average lifetime in breakage resistance test 2
3. W: abrasion loss in wear resistance test 2

It is understood from the results shown in Table 6 that the inventive samples 5-1 to 5-5 were excellent in breakage resistance and wear resistance as compared with the comparative samples 5-1 and 5-2, and the inventive samples 5-2 to 5-4 having the ratios Rc2/Rc1 within the range of 2.0 to 50 exhibited particularly superior cutting performance.

EXAMPLE 5

A comparative sample 6-1 having widths Rs1 and Rs2 of 60 μm and 90 μm and an average thickness d of 16 μm was prepared from the same base material and the same coating layer as the inventive sample 3-2 in Example 3 with no surface treatment, and a comparative sample 6-2 and inventive samples 6-1 to 6-5 were prepared as shown in Table 7, with surface treatment using an elastic grindstone having #400 SiC abrasive grains at various numbers of rotation, hardness values and pressures. These samples were subjected to the same cutting tests as Example 1. Table 7 shows the test results.

TABLE 7

| Sample No. | Surface Treatment | Rc2 (μm) | Rc1 (μm) | R2 Ratio | R1 Ratio | a (μm) | b (μm) | a/b | Tav (sec.) | W (mm) |
|---|---|---|---|---|---|---|---|---|---|---|
| Compartive Sample 6-1 | no | 106 | 76 | 1.00 | 1.00 | 0.14 | 0.07 | 2.0 | 15 | 0.29 |
| Comparative Sample 6-2 | yes | 120 | 100 | 1.13 | 1.32 | 0.15 | 0.09 | 1.7 | 23 | 0.33 |
| Inventive Sample 6-1 | yes | 120 | 60 | 1.13 | 0.79 | 0.09 | 0.09 | 1.0 | 24 | 0.25 |
| Inventive Sample 6-2 | yes | 120 | 60 | 1.13 | 0.79 | 0.15 | 0.09 | 1.7 | 29 | 0.19 |
| Inventive Sample 6-3 | yes | 120 | 50 | 1.13 | 0.66 | 0.20 | 0.07 | 2.5 | 31 | 0.16 |
| Inventive Sample 6-4 | yes | 120 | 45 | 1.13 | 0.59 | 0.26 | 0.07 | 3.7 | 26 | 0.13 |
| Inventive Sample 6-5 | yes | 120 | 40 | 1.13 | 0.53 | 0.35 | 0.07 | 5.0 | 7 | 0.12 |

Notes:
1. R2 ratio: Rc2/(Rs2 + d), R1 ratio: (Rc1/(Rs1 + d)
2. Tav: average lifetime in breakage resistance test 1
3. W: abrasion loss in wear resistance test 1

As understood from the results in Table shown 7, the inventive samples 6-1 to 6-5 exhibited excellent cutting performance as compared with the comparative samples 6-1 and 6-2. In particular, the inventive samples 6-2 to 6-4 having the ratios a/b within the range of 1.5 to 4.0 exhibited particularly superior cutting performance.

EXAMPLE 6

The inventive samples 6-1 to 6-5 and the comparative sample 6-1 prepared in Example 5 were subjected to a cutting test in relation to workpieces of round bars consisting of high carbon steel SCM435 which are prone to readily increase the cutting temperature, under the following conditions:

Wear Resistance Test 3

Cutting Speed: 180 m/min.

Feed Rate: 0.3 mm/rev.

Depth of Cut: 1.5 mm

Cutting Time: 10 min.

Cutting Oil: No

As shown in Table 8, the comparative sample 6-1 was capable of cutting the workpiece for 10 minutes despite large abrasion loss, while the inventive samples 6-3 to 6-5 sparked during cutting and failed to continue the cutting. It is inferred that the alumina layers were removed from the insert ridge portions due to surface treatment after coating in the inventive samples.

Then, an inventive sample 7-1 was prepared by coating a base material having the same composition and the same values of Rs1 and Rs2 of 60 μm and 90 μm as the inventive samples 6-1 to 6-5 and a four-layer coating film (total thickness d=16 μm) consisting of a lowermost TiN layer of 0.5 μm, an intermediate Al$_2$O$_3$ layer of 2 μm, an intermediate TiCN layer 13 μm and an uppermost TiN layer of 0.5 μm, with an alumina film provided under the same, to be left remaining on an insert ridge portion after surface treatment, to have the same values Rc1 of 45 μm, Rc2 of 120 μm, a of 0.26 mm and b of 0.07 mm as the inventive sample 6-4. When subjected to the aforementioned wear resistance test 3, this inventive sample 7-1 exhibited excellent wear resistance as shown in Table 8.

TABLE 8

| Sample No. | R2 Ratio | R1 Ratio | Alumina Film on Insert Ridge Portion | Abrasion Loss in Wear Resistance Test 3 (mm) |
|---|---|---|---|---|
| Comparative Sample 6-1 | 1.13 | 1.00 | yes | 0.35 |
| Inventive Sample 6-1 | 1.13 | 0.79 | yes | 0.28 |
| Inventive Sample 6-2 | 1.13 | 0.79 | yes | 0.26 |
| Inventive Sample 6-3 | 1.13 | 0.66 | no | sparked in 9 min. test interrupted |
| Inventive Sample 6-4 | 1.13 | 0.59 | no | sparked in 7 min. test interrupted |
| Inventive Sample 6-5 | 1.13 | 0.53 | no | sparked in 5 min. test interrupted |
| Inventive Sample 7-1 | 1.13 | 0.59 | yes | 0.24 |

Notes:
R2 ratio: Rc2/(Rs2 + d), R1 ratio: Rc1/(Rs1 + d)

From the results shown in Table 8, it is understood that an indexable insert having a coating film that includes an oxide film remaining on the insert ridge portion after surface treatment exhibits particularly excellent cutting performance in high-speed cutting of high carbon steel that readily increases the cutting temperature.

EXAMPLE 7

Inventive samples 8-1 to 8-5 were prepared by starting with the same samples as the comparative sample 1-1 that was prepared with no surface treatment, but then surface-treating these samples using elastic grindstones with #800 and #1200 SiC abrasive grains respectively. These indexable insert samples had values Rs1, Rs2, Rc1, Rc2, a, b and d of 60 μm, 90 μm, 40 μm, 90 μm, 0.15 mm, 0.08 mm and 10 μm respectively, substantially identically to the inventive sample 1-4. Then, the inventive samples 8-1 to 8-5 having increasing surface area rates of 0.2 to 1.3% and comparative sample 1-1 having an increasing surface area rate of 2.4% were compared with the inventive sample 1-4 having the increasing surface area rate of 1.5% on the insert ridge portion employed in Example 1. The increasing surface area rates were measured with an ERA8000-type measurer by Kabushiki Kaisha Elionix at a measuring magnification of 5000 for measuring fine irregularities while eliminating waving surface contours of the hard metal base materials, with sampling numbers of 280 and 210 points in the horizontal and vertical directions of the measuring field respectively.

Figure 5:
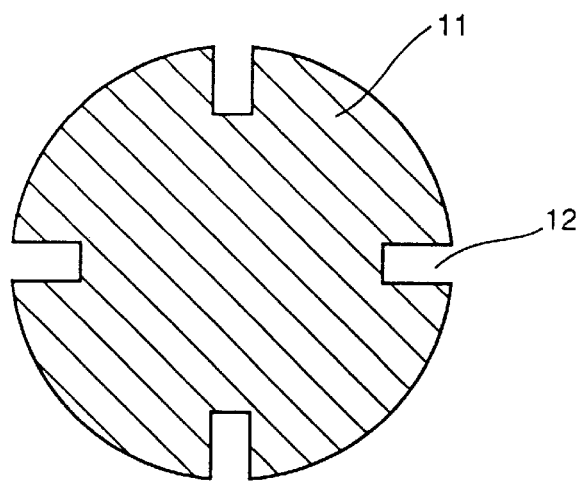
FIG. 5 is a sectional view showing a cross-sectional shape of a workpiece employed for interrupted cutting in breakage resistance tests.

Each of these indexable insert samples was employed for interrupted cutting of a workpiece 11 consisting of weldable mold steel SKD61 having the cross-sectional shape shown in FIG. 5 under the following conditions, for evaluation of peeling resistance.

Peeling Resistance Test 1
Cutting Speed: 100 m/min.
Feed Rate: 0.15 mm/rev.
Depth of Cut: 1.5 mm
Cutting Oil: No In this test, the time between the start of cutting and occurrence of a built-up edge caused by the peeling of coating film of the sample was regarded as the lifetime of the sample. Table 9 shows the test results.

TABLE 9

| Sample No. | R2 Ratio | R1 Ratio | Increasing Surface Area Rate (%) | a/b | Lifetime in Peeling Resistance Test 1 (sec.) |
|---|---|---|---|---|---|
| Inventive Sample 1-4 | 0.9 | 0.57 | 1.5 | 1.9 | 78 |
| Inventive Sample 8-1 | 0.9 | 0.54 | 0.8 | 1.9 | 152 |
| Inventive Sample 8-2 | 0.9 | 0.60 | 0.2 | 1.9 | 184 |
| Inventive Sample 8-3 | 0.9 | 0.56 | 1.3 | 1.9 | 126 |
| Inventive Sample 8-4 | 0.9 | 0.55 | 1.0 | 1.9 | 164 |
| Inventive Sample 8-5 | 0.9 | 0.56 | 0.6 | 1.9 | 167 |
| Comparative Sample 1-1 | 1.0 | 1.0 | 2.4 | 1.9 | 55 |

Notes:
R2 ratio: Rc2/(Rs2 + d), R1 ratio: Rc1/(Rs1 + d)

It is understood from the test results shown in Table 9 that an indexable insert having an increasing surface area rate within the range of 0.1 to 1.3% is particularly excellent in separation resistance. In particular, the inventive Samples 8-1, 8-2, 8-4 and 8-5 having the increasing surface area rates within the range of 0.2 to 1.0% exhibited particularly superior peeling resistance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A coated hard metal tool comprising:
a hard metal base material having a cutting edge portion with a substrate curved edge contour between a substrate flank and a substrate rake face, and
a coating film on a surface of said hard metal base material having a coating film curved edge contour extending over said substrate curved edge contour between a coating flank and a coating rake face;
wherein said substrate curved edge contour includes a first convex curved substrate surface that has a radius of curvature Rs1 and that is located bordering on said substrate flank, and a second curved substrate surface that has a radius of curvature Rs2 and that is located bordering on said substrate rake face;
wherein said coating film curved edge contour includes a first convex curved coating surface that has a radius of curvature Rc1 and that is located bordering on said coating flank, and a second convex curved coating surface that has a radius of curvature Rc2 and that is located bordering on said coating rake face;
wherein said coating film has an average thickness d at said coating flank and at said coating rake face; and
wherein said substrate curved edge contour and said coating film curved edge contour are so configured such that Rc1/(Rs1+d)<1.0 and Rc2/(Rs2+d) is at least 2.0 and not more than 5.0.

2. The coated hard metal tool in accordance with claim 1, wherein said substrate curved edge contour and said coating film curved edge contour are so configured such that Rc1/(Rs1+d) is at least 0.2 and not more than 0.8.

3. The coated hard metal tool in accordance with claim 1, wherein said substrate curved edge contour and said coating film curved edge contour are so configured such that Rc1/(Rs1+d) is at least 0.25 and not more than 0.5, and Rc2/(Rs2+d) is at least 2.17 and not more than 3.79.

4. The coated hard metal tool in accordance with claim 1, wherein said substrate curved edge contour and said coating film curved edge contour are so configured such that a ratio dx/d is at least 0.2 and not more than 0.8, wherein said average thickness d is at least 15 $\mu$m and dx represents a minimum thickness of said coating film at said coating film curved edge contour over said substrate curved edge contour.

5. The coated hard metal tool in accordance with claim 4, wherein said ratio dx/d is at least 0.2 and not more than 0.6.

6. The coated hard metal tool in accordance with claim 4, wherein said ratio dx/d is at least 0.23 and not more than 0.59.

7. The coated hard metal tool in accordance with claim 4, wherein said average thickness d is in a range from 20 $\mu$m to 50 $\mu$m.

8. The coated hard metal tool in accordance with claim 1, wherein said substrate curved edge contour and said coating film curved edge contour are so configured such that a ratio Rs2/Rs1 is at least 0.7 and not more than 1.3.

9. The coated hard metal tool in accordance with claim 8, wherein said ratio Rs2/Rs1 is at least 0.83 and not more than 1.17.

10. The coated hard metal tool in accordance with claim 1, wherein said substrate curved edge contour and said coating film curved edge contour are so configured such that a ratio Rc2/Rc1 is at least 2.0 and not more than 50.

11. The coated hard metal tool in accordance with claim 10, wherein said ratio Rc2/Rc1 is at least 2.1 and not more than 45.45.

12. The coated hard metal tool in accordance with claim 1, wherein said substrate curved edge contour and said coating film curved edge contour are so configured such that a ratio a/b is at least 1.5 and not more than 4.0, wherein a represents a width of said coating film curved edge contour extending toward said coating rake face as measured perpendicularly from a plane of said coating flank and b represents a width of said coating film curved edge contour extending toward said coating flank as measured perpendicularly from a plane of said coating rake face.

13. The coated hard metal tool in accordance with claim 12, wherein said ratio a/b is at least 1.7 and not more than 3.7.

14. The coated hard metal tool in accordance with claim 1, wherein said coating film comprises a multilayer structure including at least one oxide ceramic layer consisting of an oxide ceramic, and wherein at least a portion of a maximum thickness of said oxide ceramic layer remains and extends continuously over said substrate curved edge contour.

15. The coated hard metal tool in accordance with claim 1, wherein an increasing surface area rate on at least a portion of a surface of said coating film curved edge contour of said coating film is at least 0.1% and not more than 1.3%.

16. The coated hard metal tool in accordance with claim 1, wherein said average thickness d is at least 10 $\mu$m.

17. The coated hard metal tool in accordance with claim 1, wherein said average thickness d is at least 15 $\mu$m.

* * * * *

UNITED STATES PATENT AND TRADEMARK OFFICE
CERTIFICATE OF CORRECTION

PATENT NO. : 6,082,936

DATED : July 4, 2000

INVENTOR(S) : Moriguchi et al.

It is certified that error appears in the above-identified patent and that said Letters Patent is hereby corrected as shown below:

Col. 5, line 1, after "The", delete "minimum--;

Col. 8, line 30, after "ratios", replace "Rc1/(Rs+d)" by --Rc1/(Rs1+d)--.

Signed and Sealed this

Twenty-fourth Day of April, 2001

Attest:

NICHOLAS P. GODICI

*Attesting Officer*    *Acting Director of the United States Patent and Trademark Office*